(12) United States Patent
Charles et al.

(10) Patent No.: US 11,194,804 B2
(45) Date of Patent: Dec. 7, 2021

(54) SYSTEM AND METHOD FOR AN INDEX SEARCH ENGINE

(71) Applicant: Walmart Apollo, LLC, Bentonville, AR (US)

(72) Inventors: Kevin M. Charles, Bentonville, AR (US); John Randy Frerking, Prairie Grove, AR (US); Richard T. Jackson, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 106 days.

(21) Appl. No.: 16/210,764

(22) Filed: Dec. 5, 2018

(65) Prior Publication Data
US 2019/0171645 A1    Jun. 6, 2019

Related U.S. Application Data

(60) Provisional application No. 62/594,889, filed on Dec. 5, 2017.

(51) Int. Cl.
| | |
|---|---|
| *G06F 16/00* | (2019.01) |
| *G06F 16/2453* | (2019.01) |
| *G06F 16/22* | (2019.01) |
| *G06F 12/02* | (2006.01) |
| *G06F 12/1009* | (2016.01) |

(52) U.S. Cl.
CPC .... *G06F 16/24542* (2019.01); *G06F 12/0246* (2013.01); *G06F 12/1009* (2013.01); *G06F 16/22* (2019.01); *G06F 16/2264* (2019.01); *G06F 2212/7201* (2013.01)

(58) Field of Classification Search
None
See application file for complete search history.

(56) References Cited

U.S. PATENT DOCUMENTS

| | | | |
|---|---|---|---|
| 5,737,764 A | 4/1998 | Shigeeda | |
| 5,920,854 A | 7/1999 | Kirsch et al. | |
| 6,343,294 B1* | 1/2002 | Hawley | G06F 16/10 |
| 6,735,679 B1 | 5/2004 | Herbst et al. | |

(Continued)

FOREIGN PATENT DOCUMENTS

| | | |
|---|---|---|
| CN | 103207872 A | 7/2013 |
| CN | 103425673 A | 12/2013 |

OTHER PUBLICATIONS

International Search Report and Written Opinion dated Feb. 27, 2019, issued in corresponding PCT Application No. PCT/US2018/064056.

*Primary Examiner* — Bai D Vu
(74) *Attorney, Agent, or Firm* — Duane Morris LLP; Manita Rawat (57) ABSTRACT

A system for an index search engine includes a first non-volatile memory having a set of partitions. One partition includes one search array file having one or more search array records. The system also includes a second non-volatile memory having an index structure. The index structure includes a four-memory level configuration. Each memory level has a specified memory length. An entry in each memory level of first three levels contains a value pointing to a starting address of immediate next memory level. An entry in the fourth memory level contains a data value including an indexed field value of one of the search array records.

20 Claims, 4 Drawing Sheets

(56) References Cited

U.S. PATENT DOCUMENTS

| | | |
|---|---|---|
| 8,914,379 B2 | 12/2014 | Zhu et al. |
| 9,369,660 B2 | 6/2016 | Thambiratnam et al. |
| 2004/0024755 A1 | 2/2004 | Terrell |
| 2011/0252288 A1 | 10/2011 | Sharon et al. |
| 2011/0258034 A1 | 10/2011 | Metzler et al. |
| 2012/0170580 A1 | 7/2012 | Jagannathan et al. |
| 2013/0332660 A1 | 12/2013 | Nisha et al. |
| 2014/0188840 A1 | 7/2014 | Agarwal et al. |
| 2015/0120695 A1 | 4/2015 | Vasu et al. |
| 2016/0312234 A1 * | 10/2016 | Varian .................... G06Q 30/08 |

\* cited by examiner

Fig. 1

| IL | w1 | x | w1 | x | w1 | x | w1 | x | w1 | x | w1 | x | w1 | x | w1 | x | w1 | x | w1 | x | w1 | x | XRBA |

Fig. 2

| | prod | abc | xyz | test | rec | | baseball | hit | rbi | |
|---|---|---|---|---|---|---|---|---|---|---|
| 03 | 0 | 0 | 0 | 0 | 0 | 11 | 8 | 0 | 0 | 00000329 |
| | 9998 | 888 | AAA | A8AA | 988 | FF | 88A8899 | 88A | 988 | |
| 08 | 4 | 3 | 3 | 4 | 3 | 2 | F | 3 | 3 | 000005F9 |
| | 7964 | 123 | 789 | 3523 | 953 | 11 | 21252133 | 893 | 929 | |
| | | | | | | 1 | 8 | | | |

SYSTEM AND METHOD FOR AN INDEX SEARCH ENGINE

CROSS REFERENCE TO RELATED APPLICATIONS

This present Patent Application claims priority benefit from U.S. Provisional Patent Application No. 62/594,889 filed on Dec. 5, 2017, the entire content of which is hereby incorporated herein by reference.

BACKGROUND

1. Technical Field

The present disclosure relates to computer technology. More specifically, the present disclosure relates to systems and methods for index searching engine.

2. Introduction

Conventionally, some search mechanism simply keep breaking down in half a large list having many entries, and then search one half of the list. By looping this way, a final search result may be obtained. However, such mechanism is unable digest a large amount of inputs fast enough to get the inputs indexed, and thus is not able to inquiry on the inputs as fast enough, for example, 500,000 times/second.

What is needed are improved systems and methods for a new index and an index search engine that enables indexing and inquiring a large amount of entries quickly enough, for example 1 million times/second.

SUMMARY

Disclosed herein are systems for an index search engine, which overcome at least some drawbacks known in the art. An example system for index search engine includes a first non-volatile memory having a set of partitions. One partition includes one search array file having one or more search array records. The system also includes a second non-volatile memory having a specific index structure. The index structure includes a four-memory level configuration. Each memory level has a specified memory length. An entry in each memory level of first three levels contains a value pointing to a starting address of an immediate next memory level. An entry in the fourth memory level contains a data value including an indexed field value of one of the search array records.

An exemplary method for searching an index field value is also disclosed herein. The method includes partitioning a first non-volatile memory into a set of partitions, and writing and storing the index field value to a search array file stored in one of the partitions. The field index value and associated data values form a search array record of the search file. The method further includes indexing the index field value in an index structure in a second non-volatile memory. The index structure includes a four-memory level configuration. Each memory level has a specified memory length. An entry in each memory level of first three levels contains a value pointing to a starting address of immediate next memory level. An entry in fourth memory level contains the indexed field value.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Embodiments of this disclosure are illustrated by way of an example and not limited in the figures of the accompanying drawings, in which like references indicate similar elements and in which.

DETAILED DESCRIPTION

Various configurations and embodiments of the disclosure are described in detail below. While specific implementations are described, it should be understood that this is done for illustration purposes only. Other components and configurations may be used without parting from the spirit and scope of the disclosure.

Systems and methods disclosed herein can provide the ability to ingest large volumes of data, index the data in a data storage having a novel configuration process, and make the data searchable in near real-time. The system and method can include an index search engine (ISE). The system and method can further include an indexing algorithm. The index structure for indexing the data disclosed herein is new and performs faster and more efficient than existing data index structures. Further, the data indexing is a synchronous solution that utilizes a combination of in-memory indexes and hardened indexes written to disk.

In addition, the systems and methods disclosed herein may be able to provide near real time search results on intake of 1 million messages, having 20 structures/fields per message for 20 million unique items per second. One of the features of the disclosed systems and methods is that only one index is needed per 20 structure/fields, which can index at this rate by reducing the I/O (input/output) rate of indexes in multiple ways. For example, one way may be to remove unnecessary I/O's, and another way may be to delay I/O's.

In some embodiments of the present disclosure, when a large volume of messages, for example product log entries, are received at, for example, a computing server, the messages may be written in a format referred to as search file. The messages in a search file may also be referred to as search data. The search file may be written in a format of Entry Sequence Data Set (ESDS). As used herein, the ESDS is a type of Virtual Storage Access Method (VSAM) data set. VSAM is an access method for IBM's mainframe operating system to manage various user data types. ESDS keeps records in sequential order, and records can be accessed sequentially.

Records are held in an ESDS in the order in which they are first loaded into the data set. New records added to an ESDS typically go after the last record in the data set. Each record may be 32K byte in record length, and contain the index fields and search data. For example, a sample record with 10 index fields may be: IDX1, IDX2, . . . IDX10,search data. Search data can be written in JavaScript Object Notation (JSON) format so the search portion does not have to parse the search data and wrap it in JSON. The search data may also be written in other formats.

Each record in an ESDS is identified by its relative byte address (RBA). After a record is stored in an ESDS, its RBA remains constant. When browsing, records are retrieved in the order in which they are added to the data set. A standard RBA is an unsigned 32 bit number, which results in a standard ESDS containing no more than 4 GB of data. In this disclosure, an ESDS that supports 64 bit extended relative byte addresses (XRBAs) may also be used, which is therefore not subject to the 4 GB limit. Each record in an ESDS file has no key. XRBA values may be used to write to search array files (which will be described below in detail).

The search file may also be written in other types of VSAM data sets, for example, Key-sequenced data set (KSDS), Relative record data set (RRDS) (both fixed and variable record lengths), and/or Linear Data Set (LDS).

A KSDS has each of its records identified by a key. (The key of each record is a field in a predefined position within the record.). Each key should be unique in the KSDS. The logical order of the records in a KSDS depends on the collating sequence of the key field. To find the physical location of a record in the KSDS, VSAM creates and maintains an index, which relates the key of each record to the record's relative location in the KSDS. A RRDS is a data set containing records that are identified by their relative record number (RRN). For example, the first record in the data set is RRN 1, the second is RRN 2, and so on. A LDS is a byte-stream data set.

VSAM data sets may be stored on direct-access storage devices (DASD) auxiliary storage, for example a storage associated with the server. VSAM divides its data set storage into control areas (CA), which are further divided into logical data area known as control intervals (CI). The CI size may be 4K bytes, but it can also be up to 32K bytes. The CI may contain data records, unused space, record descriptor fields (RDFs), and a CI descriptor field. CIs are the unit of data transmission between virtual and auxiliary storage. Each one is of fixed size and, in general, contains a number of records. A KSDS or ESDS may have records that extend over more than one CI, which may be referred to as spanned records. For example, an ESDS set of files using the spanned record format may have 720,000 byte records.

To facilitate quickly searching the records in the search file, the search file may be split into different files by breaking down the search file in accordance with the index fields of records. Herein the different files split from the search file may each be referred to as a search array file. A value of each index field may be referred to as a "word" such as "Bob", "Prod", "Henry", and so on. The search array files may be stored in different partitions of a non-volatile memory, such as a hard disk or other storage devices. For example, according to system requirements, 10 partitions may be created and each assigned a partition number. One search array file can be stored in one partition, and may be allocated by the partition number.

Figure 1:
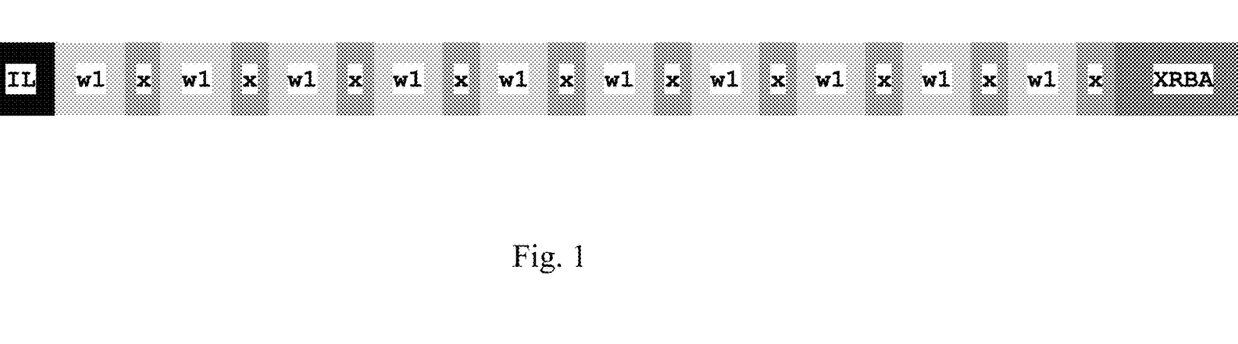
FIG. 1 illustrates an example record layout in a search array file according to one example embodiment.

A record layout in a search array may be an array of index fields from a corresponding record in the search file and associated XRBA value of the corresponding record. The record layout may in some examples be a max length of 720,000 bytes. FIG. 1 illustrates an example record layout with 10 index fields in a search array file. In FIG. 1, "IL" indicates an index length that accounts for all index fields, for example 10 index fields. The size of the index length IL may be a binary half word, for example 16 bit. "wl" indicates a word length, and the size of the wl may be a binary single byte. "x" indicates an index word string, and the size of the x can be a variable length. "XRBA" indicates a XRBA value for this record obtained from a corresponding record in the search file.

Figure 2:
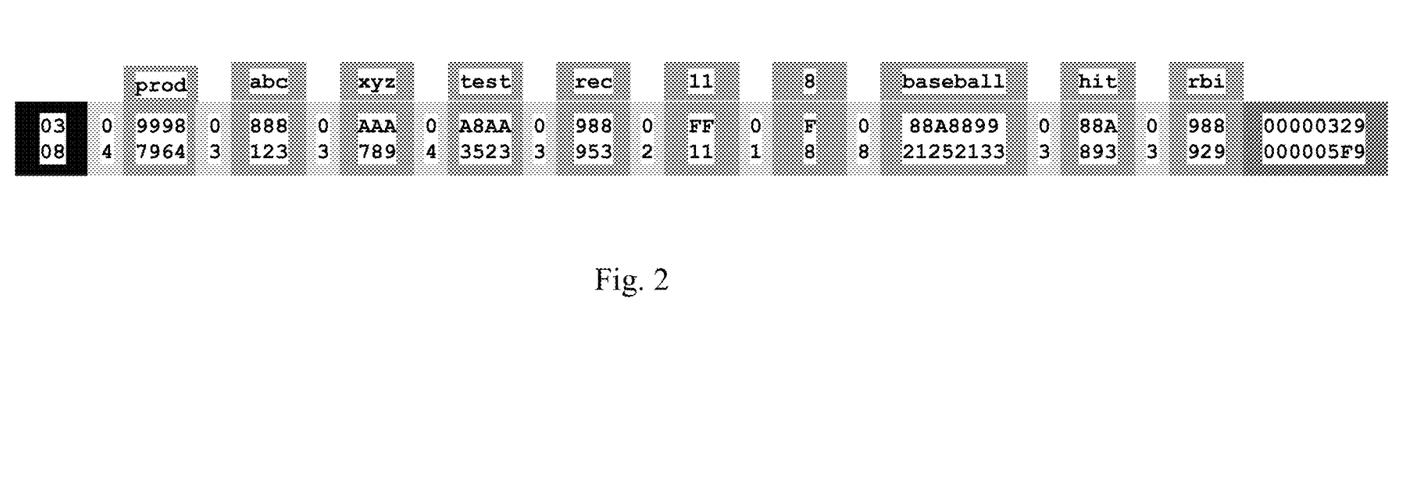
FIG. 2 illustrates an example record in the search array file of FIG. 1 according to one example embodiment.

An example record in the search array file is shown in FIG. 2 in accordance with the example record layout in FIG. 1. In FIG. 2, the following values are assigned: IDX#1=prod, IDX#2=abc, IDX#3=xyz, IDX#4=test, IDX#5=rec, IDX#6=11, IDX#7=8, IDX#8=baseball, IDX#9=hit, IDX#10=rbi, and XRBA=3485593.

In some embodiments, a search array file may be created by means of a high performance index (HPI) structure or mechanism (which will be detailed later). The HPI mechanism is employed to index an index field (as described above, its value being called a "word") of a record in the search file. The search array file can be created by looping the partition through each index field. A partition number can be obtained by looking up in the HPI to use for each indexed word (i.e., the value of an index field). For example, if the word PROD is found in a partition #3, the full set of index values and XRBA value of the record corresponding the word PROD from a search file is written in a search array file #3 that is stored in the partition #3. When the indexed word is not found in the HPI, a least used partition file is determined and set as the partition for that word, and the HPI is accordingly updated with the partition number. A counter for the number of records written to each partition file is tracked. This counter is used during the above process to determine the least used partition so the search file data can be split across all partitions.

A sample record for Index #1 in the search array file can be like the following: IDX1, IDX2, . . . IDX10, XRBA. A sample record for Index #2 in the search array file can be like the following: IDX1, IDX2, . . . IDX10, XRBA.

A value (i.e., word) of an index field may be stored in a HPI structure, and count the times of the word is referenced. The count may be stored into the corresponding search array file. Further, the partition number in the HPI index can also be tracked to determine in which partition to put the word. For example, a word "Bob" can be put in a partition #2. A word "Henry" may be put in a partition #8. With the HPI index, a word is able to be looked up and it can be determined to what file to write this word. Accordingly, the original file (i.e., the search file) can be located quickly to retrieve the record including the indexed word. The search file and the search array file can drive the immediate time frame, that is, the current interval. When all the input data are received, the data is written right in the current interval.

Figure 3:
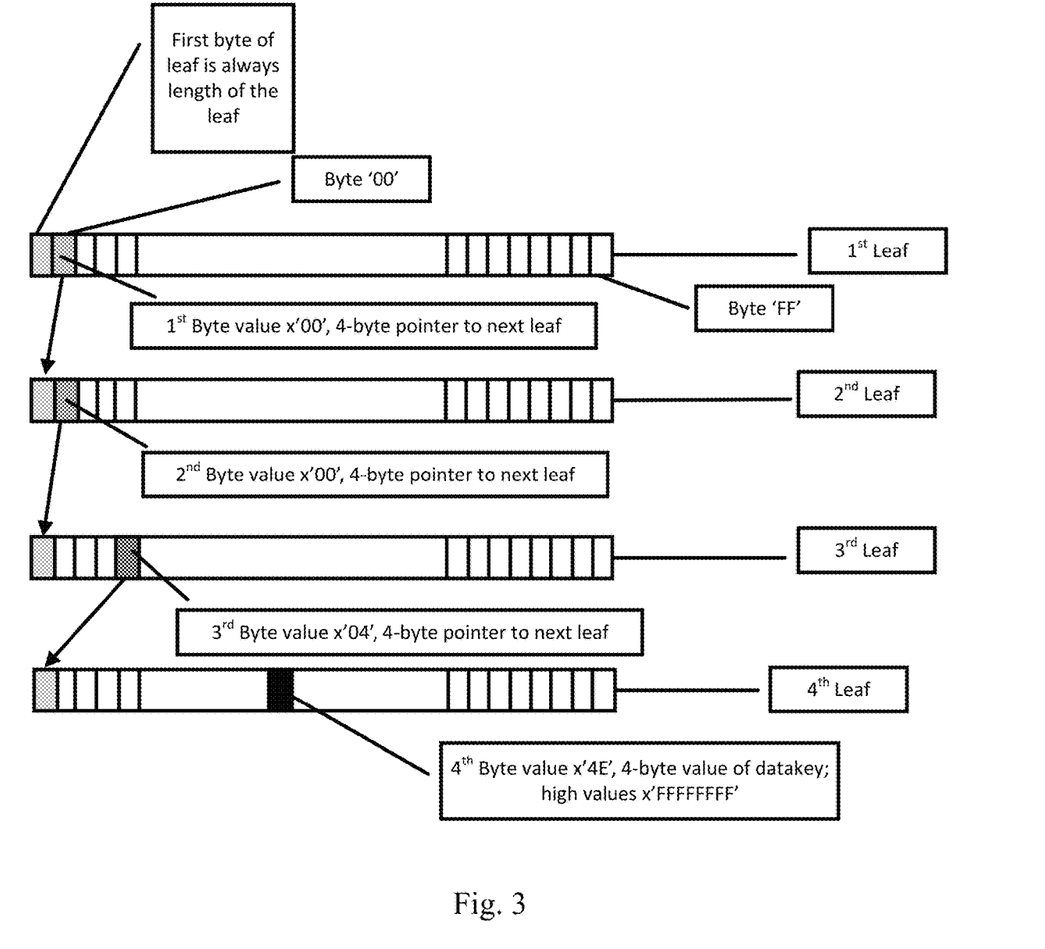
FIG. 3 illustrates an index structure according to an example embodiment.

As described above, the message data is parsed and broken down to obtain words. The words are then stored in the non-volatile memory and a count of the words is kept. FIG. 3 illustrates an example HPI structure according to one embodiment, which is a mechanism to index the words quickly and retrieve them quickly as well.

An example for indexing is given for a binary word 1102. The hex value for binary 1102 is '0000044E', the first byte is '00', the second byte is '00', the third byte is '04', and the fourth byte is '4E'. Four memory leafs (memory levels) can be created to store this index key value. As used herein, a leaf refers to a chunk of non-volatile memory address. The leaf size may be 1024 bytes long (256 byte times 4), and may also be 2048 bytes long in an extended memory. In some embodiments, there is a small difference in how the extended memory leafs are setup. There is no leaf length byte at the beginning in the extended memory leafs. All leafs in extended memory are 2048 bytes. Each leaf entry in the extended memory contains an 8 byte value pointing to the address of next leaf or data value. All extended memory addresses are eight bytes in length and referenced above the 2 gig bar (64-bit addressing). The calling program does not have to see or be concerned with 64-bit addressing structure. All values are returned to the 31-bit address area specified.

Now referring to FIG. 3, take the first byte '00' and calculate an offset by multiplying the '00' by 4, the calculated address for the next leaf (i.e. the second level leaf) is located and stored at the beginning of the first level leaf. That is, an address pointing to a next leaf is stored. Take the second byte '00', and create the second level leaf for it. Calculate by multiplying the second byte '00' by 4 to obtain an offset to the second leaf, where an address to the next leaf (i.e., a third level leaf) is stored. Take the third byte '04', and create the third level leaf Calculate an offset by multiplying the third byte '04' by 4, an offset 16 byte to the third level leaf is obtained, where an address to the next leaf (i.e., a fourth level leaf) is stored. Similarly, take the last byte '4E', and create a last, fourth level leaf for it. Calculate an offset by multiplying the last byte '4E' by 4, and the offset is located somewhere in the middle of the fourth leaf. After the last, fourth leaf, there is no leaf to jump to, so data value (e.g., the word) is store therein in that address in the fourth leaf (i.e., the offset to the fourth leaf). The data value may also include the partition number of a partition on which the indexed field value (i.e., the word) is stored, and a counter for hitting the indexed field value.

As can be seen, it is very quick to hit the data value associated with the indexed word. If the indexed word is looked up next time, just look for that hex value number, pull out '00' to find the offset in the first level leaf, and the '00' to find the offset in the second level leaf, then the offset for '04' in the third level leaf, and then the offset for '4E' in the last, fourth level leaf, where the data value is located. That is, the data value is directly hit without scanning anything, and no comparison is involved either but simply direct hit to the indexed word.

For example, once the word "Bob" is setup in the HPI structure, when the word "Bob" is searched for, just check the first byte '00" to go to the first leaf to find the address to the second leaf, from the second leaf to find the address to the third leaf, and from the third leaf to find the address to the fourth leaf from which the address for storing the word can be found by calculating an offset using the last byte of hex value of the word "Bob". The hex key value is not necessarily stored in the leaf, but is used to drive the searching process.

As can be seen, using this new data structure, this HPI algorithm has no looping involved. This process simply hits 4 times, a byte each time. Therefore, no matter how many entries there are in the search file, no looping is needed, and just hit four levels to find the result (i.e., the indexed word) immediately. Further, in the index search engine, the member of times a word is referenced is tracked. When the word is first indexed in the HPI, count it as one, then whenever this word is refereed, the count is added to. In addition, the first leaf can be chosen in any address of a non-volatile memory, which is a starting point of the first leaf.

Compared with existing search algorithms, the searching of physical values is eliminated and the values may be put in the memory for the HPI structure. No matter how many entries there are, the process just needs to transverse four levels to locate an indexed word, which may enable inquiring on entries 1 million times/second.

In some embodiments, during a current interval, each index value is written to memory, which may be referred to as in-memory index. Each index element may contain the index number, Index 'key', interval hour (HH) and search array partition (SAP) number. A sample in-memory index element may be: IDX#, IDX_key, HH, SAP.

In some embodiments, the index search engine system may include index array files. When the control interval changes, all the words from the HP index, their partition number and counts are scraped and written to such index array files. One file may be provided for each indexed field, so if there are 10 indexed fields, 10 different files may be required. In addition, the XRBA value from this entry is to be stored in an Index of Index file (which will be described later). A sample record for Index Array file may be: WL, IDX_word, II, SAP, WC, IDX_word, II, SAP, WC, IDX_word, II, SAP, WC, . . . (until 720,000 byte record is created), where WL—word length, binary single byte; IDX_word—word value; II—Interval unique id, binary single byte; SAP—Search Array Partition #, single binary byte; WC—Word count, binary full word.

In some embodiments, the index search engine system may include Index of Indexes files. An Index of Index file may be a KSDS that is used to find an index key in the Index Array file. This file is created when an interval changes, which may be at a predetermined time, such as every hour. There is one Index of Indexes file per index key. After the last index key is put in the 720,000 byte buffer and written to the Index Array file, the last index key is the key in the Index of Index file, which points to the Index Array record. This Index of Index 'key' may be used as a search from the ISE Search Engine. For example, Index #1 is 'Last Name'. The In-Memory index table for Index #1 has Aaron, (other AA* names), Adam, (other AD* names) and Albert (last A* record in Index Array record #1). When a key search for Index #1 with the name 'Adam', the search would get the record with 'Albert'. This record is an array, so the Search Engine would parse through the record to find 'Adam'.

An Index of Indexes file may be a KSDS file using spanned records with a max record length of 720,000 bytes. The key in the Index of Indexes file is 64 bytes and the data portion is an array of XRBA values. The XRBA value is obtained from the Index of Array record. One Index of Indexes file is created for each index field, for example 10 indexed fields need 10 such files. A record in the Index of Indexes file is written based on the index field number. For example, a sample record of Index of Index file (for each Index) may take a form: LastKey on IA file, XRBA, where IA is Index Array.

The Index Array and Index of Indexes files are generated when the control interval is switched. When switching, search indexes and search array file may be scraped and put in the Index Array file. When reset the search array file for a current hour, the Index Array and Index of Indexes files may be used to turn around search again quickly by pulling out history data from those two files.

Figure 4:
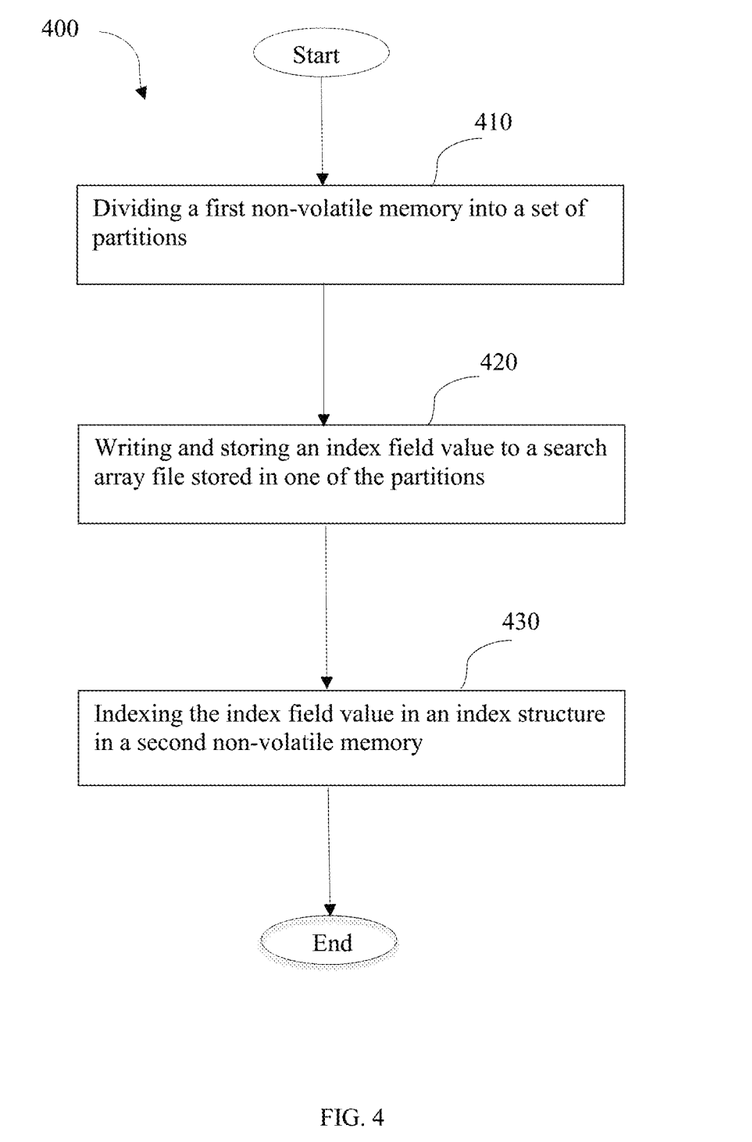
FIG. 4 illustrates a flow chart of a method for searching an indexed filed value according to an example embodiment.

Methods for searching an index field value using an index search engine (ISE) are also provided in this disclosure. FIG. 4 illustrates an example method 400 for searching an index. The method 400 may be implemented in the above described system and may include the following steps.

In step 410, a first non-volatile memory is divided into a set of partitions. Each of the partitions may be assigned a partition number.

In step 420, the index field value is written to a search array file stored in one of the partitions. The index field value and associated data values form a search array record of the search file. The search array record may also include more than one index field, for example 10 index fields.

In step 430, the index field value is indexed in an index structure in a second non-volatile memory. The index structure may be referred to as a high performance index structure/mechanism. The index structure may include a four-memory level configuration. Each memory level has a specified memory length. An entry in each memory level of first three levels contains an address value pointing to a starting address of immediate next memory level. An entry in fourth memory level contains the indexed field value. In this example, the specified memory length can be one of: 1024 bytes and 2048 bytes, and the value of the entry in each memory level of first three levels may be one of: a 4-byte value and an 8-byte value.

In some embodiments, the first non-volatile memory and the second non-volatile memory may be a same type of non-volatile memory or two different types of non-volatile memory.

In some embodiments, the entry in the fourth memory level may further include the partition number of the partition on which the indexed field value is stored, and a counter for locating the indexed field value.

In some embodiment, the value of the entry in each memory level of first three and the indexed field value of the entry in fourth memory level may be determined by a hexadecimal value of the index field value. In such a scenario, the step 430 may further include generating of a hexadecimal value of the index field value; dividing the hexadecimal value into four portions (e.g., four bytes); writing a first value to an entry of the first memory level, the first value being determined by the first portion of the hexadecimal value, for example the location (address) of the first value in the first memory level may be determined by a starting address of the first memory level and an offset address with respect to the starting address calculated using the first portion of the hexadecimal value; writing a second value to an entry of the second memory level, the second value being determined by the second portion of the hexadecimal value, for example the location (address) of the second value in the second memory level may be determined by the first value in the first memory level and an offset address with respect to the first value calculated using the second portion of the hexadecimal value; writing a third value to an entry of the third memory level, the third value being determined by the third portion of the hexadecimal value, for example the location (address) of the third value in the third memory level may be determined by the second value in the second memory level and an offset address with respect to the second value calculated using the third portion of the hexadecimal value; and writing the index field value to an entry of the fourth memory level, a location of the entry in the fourth memory level being determined by the fourth portion of the hexadecimal value, for example the location (address) of the index field value in the fourth memory level may be determined by the third value in the third memory level and an offset address with respect to the third value calculated using the fourth portion of the hexadecimal value.

In some embodiments, the step 420 may further include: searching the index structure for a partition number of the one partition; if the index field value is found in the index structure, writing the field index value and associated data values to the one partition identified by the partition number; if the index field value is not found in the index structure, writing the field index value and associated data values to the one partition that is a least used partition, and updating the index structure with a partition number of the least used partition; and counting the number of search array records written to the search array file.

In some embodiment, the method 400 may further include writing an index array file to a third non-volatile memory. The index files corresponds to the indexed field value.

In some embodiment, the method 400 may further include writing an index of indexes file to a fourth non-volatile memory. The index of indexes file corresponds to the indexed field value.

Figure 5:
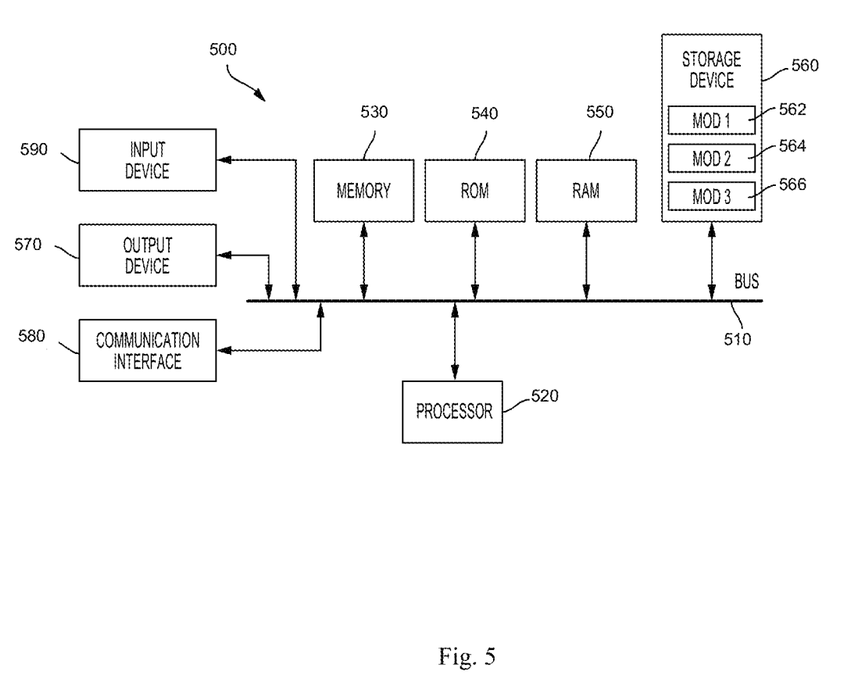
FIG. 5 illustrates an example computer system which can be used to implement the systems and methods for index search engine according to one example embodiment.

FIG. 5 illustrates an example computer system 500 which can be used to perform the systems for inventory monitoring as disclosed herein. The exemplary system 500 can include a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system for an index search engine, comprising:
   a first non-volatile memory including a set of partitions, wherein one partition includes one search array file having a format of Virtual Storage Access Method and having one or more search array records, wherein each of the one or more search array records includes an index length accounting for all indexed fields of the search array record, a length of each indexed field value, and each indexed field value; and
   a second non-volatile memory including an index structure, wherein:
      the index structure includes a four-memory level configuration;
      each memory level has a specified memory length;
      an entry in each memory level of first three levels contains a value pointing to a starting address of immediate next memory level; and
      an entry in fourth memory level contains a data value including an indexed field value of one of the search array records.

2. The system of claim 1, wherein the specified memory length is one of: 1024 bytes and 2048 bytes.

3. The system of claim 1, wherein the value of an entry in each memory level of the first three levels is one of: a 4-byte value and a 8-byte value.

4. The system of claim 1, wherein the first non-volatile memory and the second non-volatile memory are a same type of non-volatile memory or two different types of non-volatile memory.

5. The system of claim 1, wherein:
   each of the partitions is assigned a partition number; and
   the data value of an entry in the fourth memory level further includes the partition number of a partition on which the indexed field value is stored, and a counter for hitting the indexed field value.

6. The system of claim 1, wherein the value of an entry in each memory level of first three and the data value of an entry in fourth memory level are determined by a hexadecimal value of the indexed field value.

7. The system of claim 1, wherein each of the search array records includes a non-volatile memory address of a record from which the search array record is determined.

8. The system of claim 1, wherein the search array file further includes a counter for the number of search array records written thereto.

9. The system of claim 1, further comprising a third non-volatile memory, the third non-volatile memory including one or more index files, wherein each of the index files corresponds to one indexed field.

10. The system of claim 1, further comprising a fourth non-volatile memory, the fourth non-volatile memory including one or more index of indexes files, wherein each of the index of indexes files corresponds to one indexed field.

11. A method for indexing an index field value, comprising:
   dividing a first non-volatile memory into a set of partitions;
   writing and storing the index field value to a search array file stored in one of the partitions, wherein a search array record of the search array file includes an index length accounting for all indexed fields of the search array record, a length of each indexed field value, and each indexed field value; and
   indexing the index field value in an index structure in a second non-volatile memory, wherein:
      the index structure includes a four-memory level configuration;
      each memory level has a specified memory length;
      an entry in each memory level of first three levels contains a value pointing to a starting address of immediate next memory level; and
      an entry in fourth memory level contains the indexed field value.

12. The method of claim 11, wherein the specified memory length is one of: 1024 bytes and 2048 bytes.

13. The method of claim 11, wherein the value of an entry in each memory level of the first three levels is one of: a 4-byte value and a 8-byte value.

14. The method of claim 11, wherein the first non-volatile memory and the second non-volatile memory are a same type of non-volatile memory or two different types of non-volatile memory.

15. The method of claim 11, further comprising:
   assigning each of the partitions a partition number,
   wherein the entry in the fourth memory level further includes the partition number of the partition on which the indexed field value is stored, and a counter for hitting the indexed field value.

16. The method of claim 11, wherein the value of the entry in each memory level of first three and the indexed field value of the entry in fourth memory level are determined by a hexadecimal value of the index field value.

17. The method of claim 11, wherein indexing the index field value in the index structure include:
generating a hexadecimal value of the index field value;
dividing the hexadecimal value into four portions;
writing a first value to an entry of the first memory level, the first value being determined by a first portion of the hexadecimal value;
writing a second value to an entry of the second memory level, the second value being determined by a second portion of the hexadecimal value;
writing a third value to an entry of the third memory level, the third value being determined by a third portion of the hexadecimal value; and
writing the index field value to an entry of the fourth memory level, a location of the entry in the fourth memory level being determined by a fourth portion of the hexadecimal value.

18. The method of claim 11, further comprising:
searching the index structure for a partition number of the one partition;
if the index field value is found in the index structure, writing the field index value and associated data values to the one partition identified by the partition number;
if the index field value is not found in the index structure, writing the field index value and associated data values to the one partition that is a least used partition, and updating the index structure with a partition number of the least used partition; and
counting the number of search array records written to the search array file.

19. The method of claim 11, further comprising:
writing an index file to a third non-volatile memory, the index files corresponding to the indexed field value.

20. The method of claim 11, further comprising:
writing an index of indexes file to a fourth non-volatile memory, the index of indexes file corresponding to the indexed field value.

* * * * *